United States Patent [19]
Peters

[11] 3,958,485
[45] May 25, 1976

[54] DRUMSTICK

[76] Inventor: Thomas O. Peters, 2730 NE. 30th Ave., Lighthouse Point, Fla. 33064

[22] Filed: July 7, 1975

[21] Appl. No.: 593,279

[52] U.S. Cl. .............................................. 84/422 S
[51] Int. Cl.² ......................................... G10D 13/00
[58] Field of Search ................. 84/422 S, 411, 420, 84/422

[56] References Cited
UNITED STATES PATENTS

| | | | |
|---|---|---|---|
| 2,040,603 | 5/1936 | Gladstone | 84/422 S |
| 2,521,336 | 9/1950 | Bramson | 84/422 S |
| 3,146,659 | 9/1964 | Robba et al. | 84/422 S |
| 3,175,450 | 3/1965 | Criscuolo | 84/422 S |

Primary Examiner—Stephen J. Tomsky
Attorney, Agent, or Firm—Malin & Haley

[57] ABSTRACT

A drumstick for use with a musical percussion instrument integrally formed from a thermoplastic nylon matrix material and other suitable reinforcing agents such as chopped fiberglass or carbon fibers. The drumstick body is hollow and includes a plurality of longitudinally disposed internal ribs for increasing stiffness and a vibration dampener disposed within to eliminate structural vibrations or reverberations which may be caused if a drumstick is struck against a solid surface such as the rim of a drum.

4 Claims, 2 Drawing Figures

DRUMSTICK

BACKGROUND OF THE INVENTION

This invention relates generally to an improved drumstick for use in the playing of a percussion instrument and specifically to a thermoplastic, injection molded, hollow drumstick which possesses the desirable characteristics of a conventional wooden drumstick while eliminating inherent disadvantages. The use of wood in the construction of a drumstick is conventional and has found acceptance because of the tonal quality produced from the high flexural modulus of particular hard woods employed and the manueverability achieved from its relative lightweight. A hard wood used in the construction of a drumstick, such as hickory, has a flexural modulus which measured by a standardized test ASTMD 790 is 2.1 million, while ratings for different woods vary anywhere from 2.0 million down to 1.6 million.

Although wood has found common acceptance for use in drumsticks, wood has several inherent disadvantages which include moisture absorption which can alter the weight, warping, splintering, breakage and an alteration of the flexural modulus as a function of usage time resulting from reduced rigidity of the stick. Thus, it is not uncommon when utilizing a wooden drumstick for a musician to find a change in the feel of the drumstick because of the change in flexural modulus.

The instant invention provides a drumstick of improved durability which is injection molded from a thermoplastic material and possesses the desired characteristics of a conventional wooden drumstick and which will retain these characteristics over a long period of time. Further the instant invention is not subject to deterioration or breakage commonly found with conventional wood drumsticks. The instant invention also provides a new method of manufacturing a drumstick through the injection molding process.

BRIEF DESCRIPTION OF THE INVENTION

An improved drumstick comprising a hollow tubular body externally shaped, said body consisting of a thermoplastic material combined in an injection molding process with a homogeneous mixture of chopped fiberglass, carbon fiber or other suitable reinforcing agents, said body including a plurality of internally disposed, longitudinally oriented ribs adjacent the tapered end portion of the tip, and a resilient vibration dampener positioned within the tubular body, said dampener acting to attenuate structural vibrations. The overall drumstick is shaped to include a conventional tapered tip with the interior of the hollow body having a plurality of spaced, longitudinally oriented structural ribs integrally formed with the body which project from the inner tubular wall from adjacent the tip area back towards the center of the tube. An end cap is placed over the non-tapered end of the drumstick body for sealing the drumstick interior chamber. The length of the internal structural ribs are approximately one-fourth the length of the entire drumstick body. The tip is substantially solid and the adjacent exterior end portion is tapered. Before the end cap is attached to the drumstick body, a small formed piece of soft vinyl elliptically shaped with a stem and stopper is inserted within the hollow chamber of the body. Applicant has found that the use of a soft vinyl plug with a diameter approximately .020 inches less than the body internal diameter reduces and eliminates unwanted vibrations and reverberations along the drumstick body. Such unwanted vibrations may occur when the drumstick is struck against a solid object, such as the rim of the drum. The soft vinyl plug includes a stem and a stopper which engages an internal lip in the drumstick body to prevent internal movement of the plug.

To construct the instant invention, a homogeneous granular mixture of nylon or other thermoplastic material and chopped fiberglass, carbon fibers or other reinforcing agents is raised to a temperature above its melting point, both by heated bands or elements plus mechanical sheer and then injected under hydraulic pressure into a mold containing cavities having the external shape of the conventional drumstick. Central to the diameter of the cavity is a hydraulically injectable core which forms the hollow inside chamber of the drumstick itself. The melted charge is then quickly cooled by internal coolant passages within the mold at which time the cores are hydraulically retracted, the mold opening and ejecting the parts mechanically. The end caps which fit over the end of the drumstick are also injection molded.

It is an object of this invention to provide an improved drumstick for use in the playing of a percussion instrument consisting entirely of unitarily constructed, uniform plastic materials.

It is another object of this invention to provide an improved drumstick made of a thermoplastic material including a plurality of interior ribbed portions for increased structural integrity.

But yet still another object of this invention is to provide a drumstick which eliminates the disadvantages of a conventional wooden drumstick such as moisture absorption, warping, splintering and breakage while retaining the flexural modulus of an unused wooden drumstick over a longer period of time.

But yet still another object of this invention is to provide a new method of manufacturing a drumstick by injection molding.

And yet still another object of this invention is to provide a drumstick which allows two matched pairs of drumsticks having the same weight and balance characteristics to be mass produced.

But yet still another object of this invention is to provide an improved thermoplastic drumstick which is hollow and includes a resilient plug for damping vibrations caused when the drumstick is struck against a solid surface such as a rim edge of a drum.

In accordance with these and other objects which will be apparent hereinafter, the instant invention will now be described with particular reference to the accompanying drawings.

PREFERRED EMBODIMENT OF THE INVENTION

Figure 1:
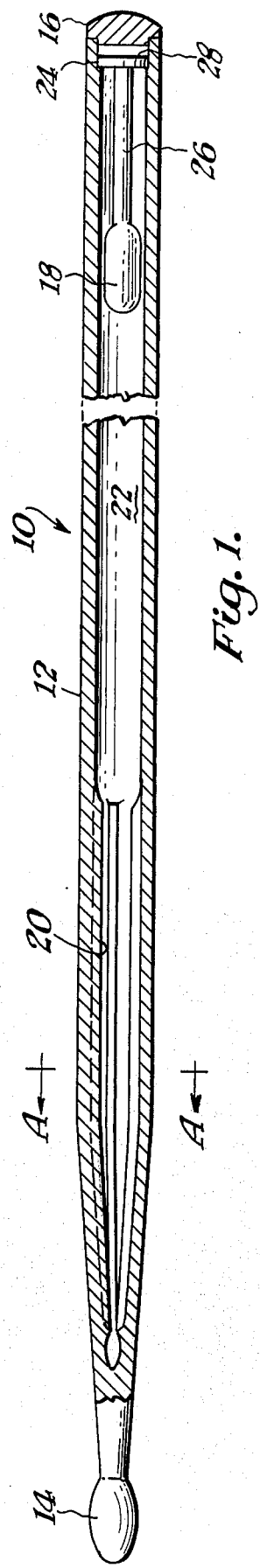
FIG. 1 shows a side elevational view of the instant invention in cross-section.

Referring now to the drawings and especially FIG. 1, the instant invention is shown generally at 10 comprising an elongated tubular body 12 formed from an injected molded mixture which may consist of approximately 60 – 40 percent thermoplastic matrix material and 40 – 60 percent reinforcing agent such as chopped fiberglass and/or carbon fiber, respectively. The applicant has found utilizing these particular materials in these proportions in an injection molding process that a flexural modulus of 2.1 million may be obtained in the drumstick body (the same as a used hickory drumstick). The exterior shape of drumstick 10 is that of a conventional drumstick and may be constructed in different sizes in accordance with the particular type of drums to be played. Adjacent the tip 14, the exterior drumstick body 12 is tapered. The hollow interior chamber begins within the tapered body section and continues to the opposite end, which is sealed with a cap 16. Integrally molded along the inside hollow chamber of drumstick 12 is a plurality of raised surface portions constituting ribs 20 which extend from the beginning of chamber 22 adjacent tip 14 approximately one-quarter the length of the stick. In the preferred embodiment, the chamber wall has five reinforcing ribs, equally distributed about the circular interior surface. The ribs 20 provide for additional longitudinal strength adjacent the tip of the device and overall balancing of the drumstick itself.

The end cap is molded separately and affixed after the body 12 has achieved its final form. Prior to affixing the end cap 16 a resilient, soft vinyl plug 18 with stem 26 and stopper 28 is inserted into the body chamber 22, the stopper 28 engaging a lip 24 on the inside of body 12. The soft vinyl plug 18 is constructed to loosely engage the inner wall surface (0.020 inches less in diameter than the body inside diameter). The purpose of the resilient plug 18 is to act as a vibration dampener when the drumstick body strikes a solid or hard object such as the rim of a drum. In an alternate embodiment, applicant has found that an arcuate shaped rubber tube may be also utilized as a vibration dampener.

Figure 2:
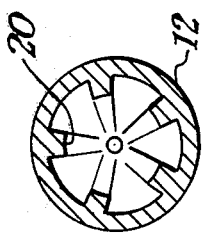
FIG. 2 shows a cross-section of the device shown in FIG. 1 through line A–A'.

FIG. 2 shows a cross-section of body 12 with raised wall portions forming reinforcing ribs 20. The center of gravity of the drumstick is equivalent to that of a conventional wooden drumstick and is not materially altered by the additional mass of the reinforcing ribs disposed toward the tip end of the drumstick.

The invention includes a new method for manufacturing a drumstick, which is accomplished by injection molding. First, a homogeneous granular mixture consisting of nylon or other thermoplastic material and a reinforcing agent such as chopped fiberglass or carbon fiber is heated by bands or elements and mechanical shear above its melting point. The mixture is then injected under hydraulic pressure into a mold containing cavities formed in the external shape of a conventional drumstick. Central to the diameter of the cavity is a hydraulically insertable core for forming the interior hollow chamber within the drumstick body. The melted charge is quickly cooled by internal coolant passages within the mold at which time the cores are hydraulically retracted. The mold opener and parts are ejected mechanically. Each mold may contain a plurality of such drumstick shaped cavities and cores and also additional cavities to produce the end caps. The homogeneous granular mixture is comprised of approximately from 60 to 40 percent nylon or other suitable thermoplastic material and from 40 to 60 percent chopped fiberglass or carbon fiber or some proportional combination containing both chopped fiberglass and carbon fiber, totalling 40 – 60 percent of the entire mixture. Applicant has determined that the use of these materials in an injection molding process in combination with the reinforcing ribs produces an improved, extremely durable drumstick having the same playing feel and tonal quality as that of a conventional wooden drumstick and includes the ability of maintaining a particular flexural modulus over a long time period.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An improved drumstick consisting of a thermoplastic material and a reinforcing agent of substantially unitary construction comprising:
   an elongated tubular body, said tubular body having the exterior shape of a conventional drumstick, said body including a hollow disposed substantially along the length of said body, said body including a solid tip portion adjacent one end with a conically tapered portion towards the middle of said body;
   a plurality of raised, longitudinally disposed reinforcing ribs integrally formed along the interior chamber wall disposed adjacent the tip end of said body; and
   a cap connected to the end of said body opposite said body tip.

2. A plastic drumstick, as in claim 1, including:
   means disposed within said body chamber for dampening mechanical vibrational motion within said body structure.

3. A drumstick, as in claim 1, wherein said drumstick body material consists of approximately 60 to 40 percent nylon and 40 to 60 percent chopped fiberglass and carbon fibers.

4. An improved drumstick comprising:
   an elongated tubular thermoplastic body externally shaped in the form of a conventional drumstick, said body having a solid tip portion and a hollow handle portion, said hollow portion including a plurality of longitudinally disposed reinforcing ribs disposed on the inside of said hollow body.

* * * * *